United States Patent
Shindo (10) Patent No.: US 7,903,732 B2
(45) Date of Patent: Mar. 8, 2011

(54) METHOD AND APPARATUS FOR ENCODING A MOVING-PICTURE SIGNAL BY CALCULATING THE COMPLEXITY OF THE MOVING-PICTURE SIGNAL

(75) Inventor: Tomoyuki Shindo, Yamato (JP)

(73) Assignee: Victor Company of Japan, Ltd., Yokohama (JP)

( * ) Notice: Subject to any disclaimer, the term of this patent is extended or adjusted under 35 U.S.C. 154(b) by 1535 days.

(21) Appl. No.: 11/255,889

(22) Filed: Oct. 24, 2005

(65) Prior Publication Data
US 2006/0093032 A1  May 4, 2006

(30) Foreign Application Priority Data

Nov. 4, 2004 (JP) .................... 2004-321315

(51) Int. Cl.
*H04N 7/12* (2006.01)
(52) U.S. Cl. .................... 375/240.03
(58) Field of Classification Search .......... 375/240.03
See application file for complete search history.

(56) References Cited

U.S. PATENT DOCUMENTS

| | | | |
|---|---|---|---|
| 5,978,029 A * | 11/1999 | Boice et al. | 375/240.14 |
| 6,324,214 B2 * | 11/2001 | Mihara | 375/240.02 |
| 6,510,176 B1 * | 1/2003 | Fukuda et al. | 375/240.02 |
| 6,697,567 B1 * | 2/2004 | Suzuki | 386/111 |
| 6,775,326 B2 * | 8/2004 | Sekiguchi et al. | 375/240.14 |
| 7,126,988 B2 * | 10/2006 | Yoneyama | 375/240.01 |
| 2003/0206584 A1 * | 11/2003 | Morita et al. | 375/240.02 |

FOREIGN PATENT DOCUMENTS

| | | |
|---|---|---|
| JP | 6-141298 | 5/1994 |
| JP | 10-164577 | 6/1998 |
| JP | 2001-238215 | 8/2001 |

\* cited by examiner

*Primary Examiner* — David P Rashid
(74) *Attorney, Agent, or Firm* — Louis Woo (57) ABSTRACT

A signal related to input moving pictures of plural different types is quantized in response to a variable quantization scale factor before being encoded. An actual complexity of each past encoded picture originating from one of the input moving pictures is calculated. A complexity of a next encoded picture is estimated in response to the actual complexity of a past encoded picture same in type as the next encoded picture in cases where the next encoded picture does not correspond to a scene change. A complexity of the next encoded picture is estimated in response to the actual complexity of a past encoded picture different in type from the next encoded picture in cases where the next encoded picture corresponds to a scene change. A value of the quantization scale factor used for the quantization is decided in response to the estimated complexity.

6 Claims, 5 Drawing Sheets

METHOD AND APPARATUS FOR ENCODING A MOVING-PICTURE SIGNAL BY CALCULATING THE COMPLEXITY OF THE MOVING-PICTURE SIGNAL

BACKGROUND OF THE INVENTION

1. Field of the Invention

This invention relates to a method and an apparatus for encoding a moving-picture signal through signal processing steps including a step of calculating the complexity of a picture and a step of deciding a quantization scale used by the quantization of a signal segment representative of that picture in response to the calculated complexity.

2. Description of the Related Art

MPEG-2 (Moving Picture Experts Group Phase 2) means international standards for a technique of efficiently encoding a moving-picture signal such as a television signal. The MPEG-2 standards prescribe motion-compensated prediction and transform-based encoding which allow data compression.

The motion-compensated prediction is designed to implement the following steps. Each of frames constituting a moving-picture sequence is partitioned into equal-size blocks of pixels, that is, macroblocks of 16 by 16 pixels. A motion vector between a current picture and a reference picture is calculated for every macroblock. A predicted picture for the current picture is generated from the reference picture in response to the calculated motion vectors.

According to the transform-based encoding, a signal representative of the error (residual) between the current picture and the predicted picture is subjected to orthogonal transform, specifically discrete cosine transform (DCT). When the current picture is selected as an intra-coded picture (I-picture), the current picture is directly subjected to DCT.

Japanese patent application publication number 6-141298/1994 discloses a variable-transfer-rate encoding apparatus for moving-picture data. In the apparatus of Japanese application 6-141298/1994, an input moving-picture signal is subjected to first encoding which uses a fixed quantization scale. The first encoding is referred to as tentative encoding. During the tentative encoding, the amount of encoded data (encoding-resultant data) is counted for every unit time interval. Target transfer rates are set on the basis of the counted data amounts for the respective unit time intervals. The target transfer rates are chosen so that the total amount of encoded data originating from the whole of the input moving-picture signal will be equal to a prescribed value. Finally, the input moving-picture signal is subjected to second encoding, that is, real encoding in which the actual amount of encoded data is controlled to equalize the actual transfer rate to the target transfer rate for every unit time interval.

The apparatus of Japanese application 6-141298/1994 is of a 2-path type, performing the encoding of the input moving-picture signal twice. Therefore, the apparatus is unsuited to usage requiring real-time signal processing.

Japanese patent application publication number 10-164577/1998 discloses a moving-picture data encoding apparatus of a 1-path type which encodes moving-picture data at a variable rate on a real-time basis. In the apparatus of Japanese application 10-164577/1998, the amount of encoded data (encoding-resultant data) is counted for every frame, and the average value of quantization step sizes for the respective macroblocks constituting that frame is calculated. The counted amount of encoded data and the calculated average quantization step size are multiplied to get a complexity of that frame. The average value of the complexities of past frames is calculated. The ratio between the calculated average past-frame complexity and the complexity of a current frame is computed. A desired amount of encoded data for a next frame is decided on the basis of the computed complexity ratio. A quantization step size for the next frame is determined in response to the desired amount of encoded data for the next frame. A moving-picture data segment representing the next frame is quantized in accordance with the determined quantization step size.

In the apparatus of Japanese application 10-164577/1998, the ratio between the average past-frame complexity and the current-frame complexity is used to decide the desired amount of encoded data for the next frame. Thus, the desired amount of encoded data for the next frame is decided on the basis of the current-frame complexity. Generally, in the case where a scene change occurs between the current frame and the next frame, a greater desired amount of encoded data for the next frame is nice to attain a good picture quality. In the apparatus of Japanese application 10-164577/1998, the desired amount of encoded data for the next frame tends to be less than the desirable greater value since it is decided on the basis of the current-frame complexity. Thus, a picture quality tends to drop immediately after the scene change.

In the apparatus of Japanese application 10-164577/1998, there are an average past-frame complexity corresponding to past I pictures (intra-coded pictures), an average past-frame complexity corresponding to past P pictures (forward predictive coded pictures), and an average past-frame complexity corresponding to past B pictures (bidirectionally predictive coded pictures). When the next frame is an I picture, the ratio between the past past-I-frame complexity and the complexity of the last I frame is used to decide the desired amount of encoded data for the next frame. When the next frame is a P picture, the ratio between the average past-P-frame complexity and the complexity of the last P frame is used to decide the desired amount of encoded data for the next frame. When the next frame is a B picture, the ratio between the average past-B-frame complexity and the complexity of the last B frame is used to decide the desired amount of encoded data for the next frame. Generally, in the case where a scene change occurs between the next frame and the last frame of the picture type same as that about the next frame, a greater desired amount of encoded data for the next frame is nice to attain a good picture quality. In the apparatus of Japanese application 10-164577/1998, the desired amount of encoded data for the next frame tends to be less than the desirable greater value since it is decided on the basis of the complexity of the last frame of the picture type same as that about the next frame. Thus, a picture quality tends to drop immediately after the scene change. Especially, a picture quality tends to significantly drop when the last frame and the next frame are B pictures.

Japanese patent application publication number 2001-238215 discloses a moving picture encoding apparatus in which input moving pictures are of I, P, and B types, and thus the input moving pictures include I pictures, P pictures, and B pictures. A signal related to the input moving pictures is quantized in response to a variable quantization scale factor before being encoded. The apparatus in Japanese application 2001-238215 has a device for detecting a scene change in the input moving pictures and identifying a scene change picture thereamong. In the apparatus of Japanese application 2001-238215, an actual complexity of each past encoded picture originating from one of the input moving pictures is calculated. A complexity of a next encoded picture being either a P picture or a B picture is estimated in response to the actual complexity of a past encoded picture same in type as the next encoded picture regardless of whether or not the next encoded picture is a scene change picture. A value of the quantization scale factor used for the quantization is decided in response to the estimated complexity.

SUMMARY OF THE INVENTION

It is a first object of this invention to provide an apparatus for encoding a moving-picture signal which attains an enhanced picture quality related to an encoding-resultant signal immediately after a scene change.

It is a second object of this invention to provide a method of encoding a moving-picture signal which attains an enhanced picture quality related to an encoding-resultant signal immediately after a scene change.

A first aspect of this invention provides an apparatus for encoding a moving-picture signal. The apparatus comprises first means for generating motion-compensated predictive errors of input moving pictures of plural different types; second means for subjecting the input moving pictures and the motion-compensated predictive errors generated by the first means to orthogonal transform to generate transform-resultant coefficients; third means for quantizing the transform-resultant coefficients generated by the second means in response to a variable quantization scale factor to generate quantization results; fourth means for encoding the quantization results generated by the third means into words of a prescribed variable-length code; fifth means for controlling a code amount of the words generated by the fourth means by adjusting the quantization scale factor used in the third means; sixth means for detecting characteristics of the input moving pictures; seventh means for detecting whether or not a scene change occurs in the input moving pictures on the basis of the characteristics detected by the sixth means; eighth means for detecting an average value of the quantization scale factor used in the third means for each of the input moving pictures; ninth means for detecting a code amount generated by the encoding by the fourth means; tenth means for calculating an actual complexity of each past encoded picture among the input moving pictures from the quantization-scale-factor average value detected by the eighth means and the code amount detected by the ninth means; eleventh means for deciding whether or not a next encoded picture among the input moving pictures corresponds to a scene change, the occurrence of which is detected by the seventh means; twelfth means for calculating an estimated complexity of the next encoded picture from the actual complexity of a past encoded picture same in type as the next encoded picture which is calculated by the tenth means in cases where the eleventh means decides that the next encoded picture does not correspond to a scene change; thirteenth means for calculating an estimated complexity of the next encoded picture from the actual complexity of a past encoded picture different in type from the next encoded picture which is calculated by the tenth means in cases where the eleventh means decides that the next encoded picture corresponds to a scene change; and fourteenth means for deciding a value of the quantization scale factor used in the third means for the next encoded picture in response to the estimated complexity of the next encoded picture which is calculated by one of the twelfth means and the thirteenth means.

A second aspect of this invention is based on the first aspect thereof, and provides an apparatus wherein the thirteenth means operates for calculating an estimated complexity of the next encoded picture from the actual complexity of a past encoded P picture which is calculated by the tenth means in cases where the next coded picture is a B picture.

A third aspect of this invention is based on the first aspect thereof, and provides an apparatus wherein the thirteenth means operates for calculating an estimated complexity of the next encoded picture from the actual complexity of a past encoded I picture which is calculated by the tenth means in cases where the next coded picture is a P picture.

A fourth aspect of this invention is based on the first aspect thereof, and provides an apparatus further comprising fifteenth means for calculating a frame activity of each of the input moving pictures; sixteenth means for calculating activities of fields in each of the input moving pictures, and adding the calculated activities of fields to calculate a two-field activity; seventeenth means for calculating a ratio between the frame activity calculated by the fifth means and the two-field activity calculated by the sixteenth means; eighteenth means for deciding whether or not the next encoded picture and a reference picture for the next encoded picture are equal in motion state on the basis of the ratio calculated by the seventeenth means; nineteenth means for calculating an estimated complexity of the next encoded picture in response to the actual complexity of a past encoded picture same in type as the next encoded picture which is calculated by the tenth means in cases where the eighteenth means decides that the next encoded picture and the reference picture for the next encoded picture are equal in motion state; twentieth means for calculating an estimated complexity of the next encoded picture in response to the actual complexity of a past encoded picture different in type from the next encoded picture which is calculated by the tenth means in cases where the eighteenth means decides that the next encoded picture and the reference picture for the next encoded picture are not equal in motion; and twenty-first means for deciding a value of the quantization scale factor used in the third means for the next encoded picture in response to the estimated complexity of the next encoded picture which is calculated by one of the nineteenth means and the twentieth means.

A fifth aspect of this invention provides a method of encoding a moving-picture signal. The method comprises the steps of generating motion-compensated predictive errors of input moving pictures of plural different types; subjecting the input moving pictures and the generated motion-compensated predictive errors to orthogonal transform to generate transform-resultant coefficients; quantizing the generated transform-resultant coefficients in response to a variable quantization scale factor to generate quantization results; encoding the generated quantization results into words of a prescribed variable-length code; controlling a code amount of the words by adjusting the quantization scale factor; detecting characteristics of the input moving pictures; detecting whether or not a scene change occurs in the input moving pictures on the basis of the detected characteristics; detecting an average value of the quantization scale factor used for each of the input moving pictures; detecting a code amount generated by the encoding of the quantization results; calculating an actual complexity of each past encoded picture among the input moving pictures from the detected quantization-scale-factor average value and the detected code amount; deciding whether or not a next encoded picture among the input moving pictures corresponds to a scene change, the occurrence of which is detected; calculating an estimated complexity of the next encoded picture from the calculated actual complexity of a past encoded picture same in type as the next encoded picture in cases where it is decided that the next encoded picture does not correspond to a scene change; calculating an estimated complexity of the next encoded picture from the calculated actual complexity of a past encoded picture different in type from the next encoded picture in cases where it is decided that the next encoded picture corresponds to a scene change; and deciding a value of the quantization scale factor used for the next encoded picture in response to the estimated complexity of the next encoded picture.

A sixth aspect of this invention is based on the fifth aspect thereof, and provides a method wherein an estimated complexity of the next encoded picture is calculated from the calculated actual complexity of a past encoded P picture in cases where the next coded picture is a B picture.

A seventh aspect of this invention is based on the fifth aspect thereof, and provides a method wherein an estimated complexity of the next encoded picture is calculated from the calculated actual complexity of a past encoded I picture in cases where the next coded picture is a P picture.

An eighth aspect of this invention is based on the fifth aspect thereof, and provides a method further comprising the steps of calculating a frame activity of each of the input moving pictures; calculating activities of fields in each of the input moving pictures, and adding the calculated activities to calculate a two-field activity; calculating a ratio between the calculated frame activity and the calculated two-field activity; deciding whether or not the next encoded picture and a reference picture for the next encoded picture are equal in motion state on the basis of the calculated ratio; calculating an estimated complexity of the next encoded picture in response to the calculated actual complexity of a past encoded picture same in type as the next encoded picture in cases where it is decided that the next encoded picture and the reference picture for the next encoded picture are equal in motion state; calculating an estimated complexity of the next encoded picture in response to the calculated actual complexity of a past encoded picture different in type from the next encoded picture in cases where it is decided that the next encoded picture and the reference picture for the next encoded picture are not equal in motion; and deciding a value of the quantization scale factor used for the next encoded picture in response to the estimated complexity of the next encoded picture.

A ninth aspect of this invention provides an apparatus for encoding a moving-picture signal. The apparatus comprises first means for subjecting a signal representative of input moving pictures of plural different types to orthogonal transform to generate transform-resultant coefficients; second means for quantizing the transform-resultant coefficients generated by the first means in response to a variable quantization scale factor to generate quantization results; third means for encoding the quantization results generated by the second means into words of a prescribed variable-length code to encode the input moving pictures; fourth means for detecting whether or not a scene change occurs in the input moving pictures; fifth means for calculating an actual complexity of each past encoded picture originating from one of the input moving pictures; sixth means for deciding whether or not a next encoded picture among the input moving pictures corresponds to a scene change, the occurrence of which is detected by the fourth means; seventh means for estimating a complexity of the next encoded picture in response to the actual complexity of a past encoded picture same in type as the next encoded picture which is calculated by the fifth means in cases where the sixth means decides that the next encoded picture does not correspond to a scene change; eighth means for estimating a complexity of the next encoded picture in response to the actual complexity of a past encoded picture different in type from the next encoded picture which is calculated by the fifth means in cases where the sixth means decides that the next encoded picture corresponds to a scene change; and ninth means for deciding a value of the quantization scale factor used in the second means in response to the complexity estimated by one of the seventh means and the eighth means.

This invention has advantages indicated below. For a scene-change-corresponding P picture, the estimated P-picture complexity Xp is computed by using the actual I-picture complexity rather than the actual P-picture complexity. In general, a scene change increases the number of intra-coded macroblocks in a scene-change-corresponding P picture. An I picture is composed of intra-coded macroblocks only. Thus, the use of the actual I-picture complexity for the computation of the estimated P-picture complexity is reasonable and causes a good quality of the encoding-resultant picture originating from the scene-change-corresponding P picture. For a scene-change-corresponding B picture, the estimated B-picture complexity is computed by using the actual P-picture complexity rather than the actual B-picture complexity. In general, a scene change causes bidirectional prediction to be less dominant over a scene-change-corresponding B picture. A P picture is encoded without bidirectional prediction. Thus, the use of the actual P-picture complexity for the computation of the estimated B-picture complexity is reasonable and causes a good quality of the encoding-resultant picture originating from the scene-change-corresponding B picture.

DETAILED DESCRIPTION OF THE INVENTION

A prior-art apparatus will be explained below for a better understanding of this invention.

Figure 1:
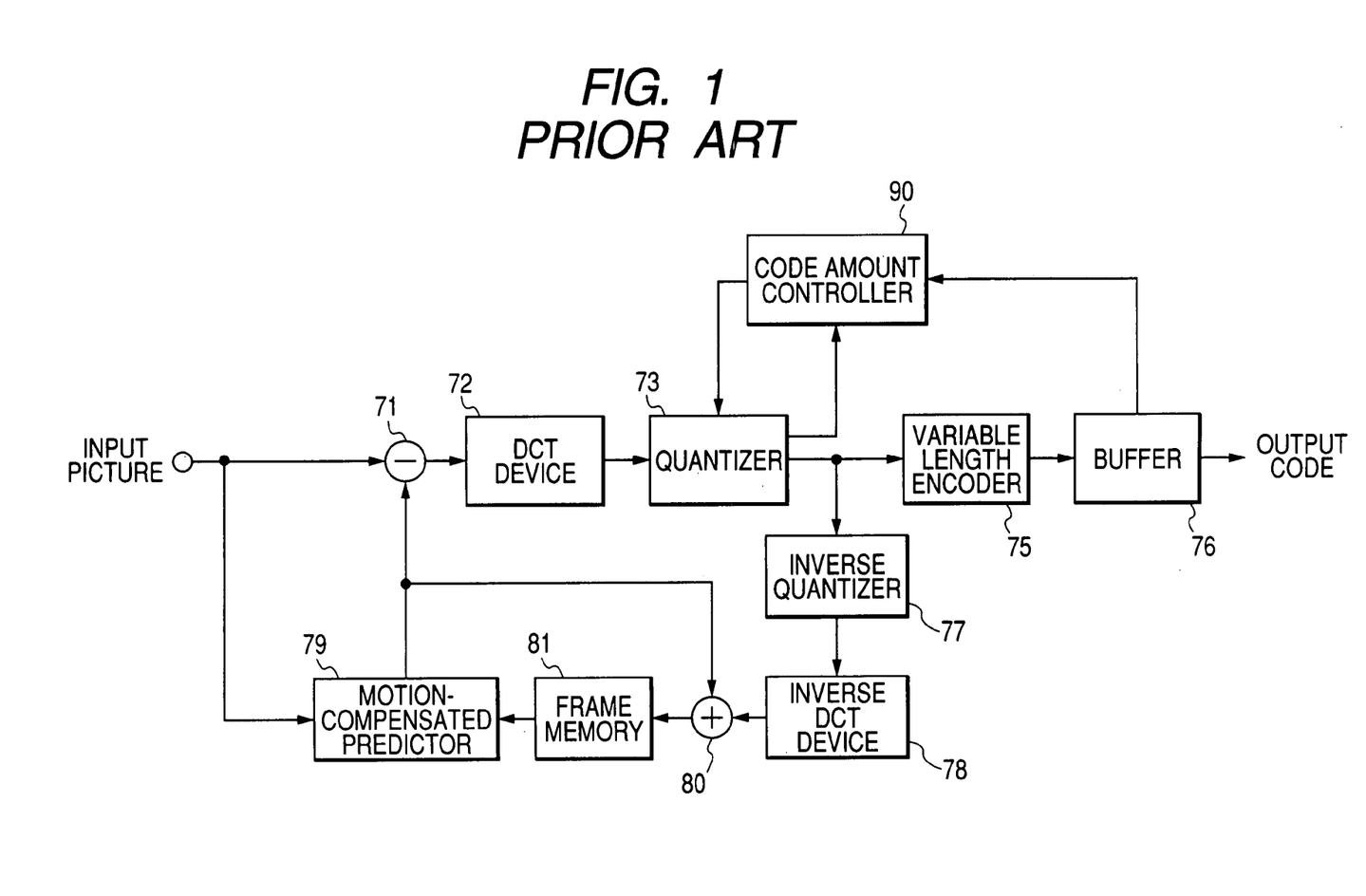
FIG. 1 is a block diagram of a prior-art apparatus for encoding a moving-picture signal in conformity with the MPEG-2 standards.

FIG. 1 shows a prior-art apparatus for encoding a moving-picture signal in conformity with the MPEG-2 standards. Every frame related to an input moving-picture signal is divided into macroblocks of 16 pixels by 16 pixels. The prior-art apparatus of FIG. 1 processes the input moving-picture signal on a macroblock-by-macroblock basis.

Figure 2:
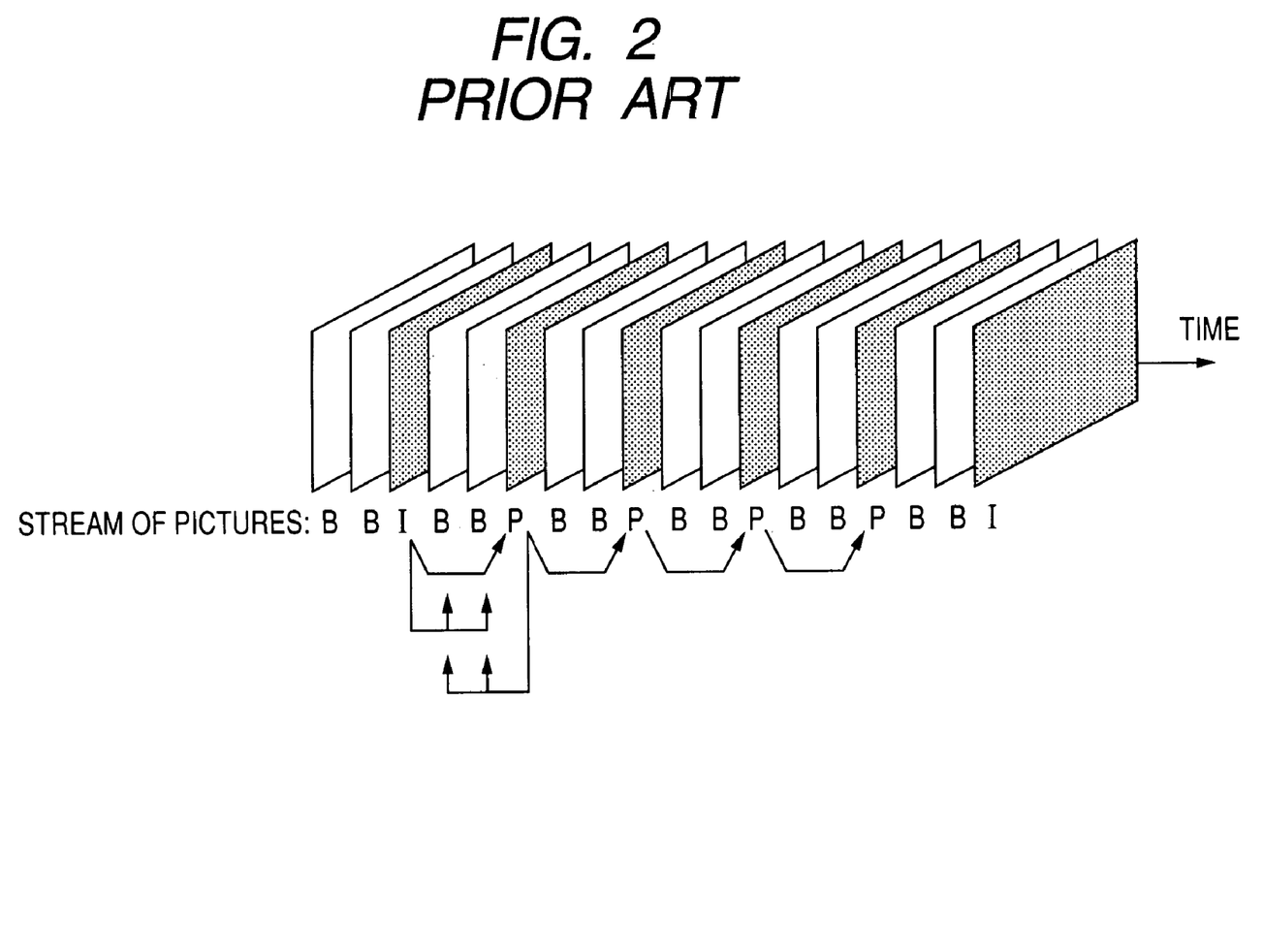
FIG. 2 is a time-domain diagram of successive pictures represented by a moving-picture signal.

With reference to FIG. 2, the input moving-picture signal represents a stream of pictures of three different types which include I pictures (intra-coded pictures), P pictures (forward predictive coded pictures), and B pictures (bidirectionally predictive coded pictures). In a lower part of FIG. 2, the arrows denote the directions of prediction. Preferably, the order in which pictures are arranged is changed from the original to allow a proper encoding procedure including bidirectional prediction. The after-change order is referred to as the encoding order.

The prior-art apparatus of FIG. 1 includes a subtracter 71, a discrete cosine transform (DCT) device 72, a quantizer 73, a variable-length encoder 75, a buffer (memory) 76, an inverse quantizer 77, an inverse DCT device 78, a motion-compensated predictor 79, an adder 80, a frame memory 81, and a code amount controller 90.

Macroblocks of the input moving-picture signal are sequentially applied to the subtracter 71 and the motion-compensated predictor 79. The subtracter 71 is successively followed by the DCT device 72, the quantizer 73, the variable-length encoder 75, and the buffer 76. The inverse quantizer 77 is connected with the quantizer 73. The inverse quantizer 77 is successively followed by the inverse DCT device 78, the adder 80, the frame memory 81, and the motion-compensated predictor 79. The motion-compensated predictor 79 is connected with the subtracter 71 and the adder 80. The code amount controller 90 is connected with the quantizer 73 and the buffer 76.

For every I picture represented by the input moving-picture signal, the subtracter 71 sequentially passes macroblocks of the input moving-picture signal to the DCT device 72 without processing them. The DCT device 72 divides every macroblock into sub-blocks of 8 pixels by 8 pixels. The DCT device 72 subjects each sub-block to discrete cosine transform, thereby generating DCT coefficients. The DCT device 72 outputs the DCT coefficients to the quantizer 73.

The device 73 quantizes the DCT coefficients in response to a quantization scale factor to get quantized DCT coefficients. The quantization scale factor is notified by the code amount controller 90. The quantizer 73 outputs the quantized DCT coefficients to the variable-length encoder 75 and the inverse quantizer 77.

The variable-length encoder 75 converts the quantized DCT coefficients into words of a prescribed variable-length code. The variable-length encoder 75 sequentially outputs the variable-length code words to the buffer 76. The buffer 76 temporarily stores the variable-length code words before sequentially outputting them in properly-adjusted time base as an output bit stream.

The inverse quantizer 77 and the inverse DCT device 78 cooperate to implement local decoding. Specifically, the device 77 inversely quantizes the quantized DCT coefficients to recover the original DCT coefficients. The inverse quantizer 77 outputs the recovered DCT coefficients to the inverse DCT device 78. The device 78 subjects the recovered DCT coefficients to inverse discrete cosine transform, thereby recovering each original sub-block. The inverse DCT device 78 combines recovered sub-blocks into each decoded macroblock (each local decoded picture). The inverse DCT device 78 sequentially outputs the decoded macroblocks to the adder 80.

For every I picture represented by the input moving-picture signal, the adder 80 passes the decoded macroblocks to the frame memory 81 without processing them. The frame memory 81 stores the decoded macroblocks as an indication of a recovered I picture for later use.

For every P picture represented by the input moving-picture signal, the frame memory 81 outputs decoded macroblocks representative of a past I picture or a past P picture to the motion-compensated predictor 79. The motion-compensated predictor 79 implements motion vector detection and motion compensation in response to the macroblocks of the input moving-picture signal and the decoded macroblocks, thereby generating predictive macroblocks. The motion-compensated predictor 79 sequentially outputs the predictive macroblocks to the subtracter 71 and the adder 80.

The device 71 subtracts the predictive macroblocks from the macroblocks of the input moving-picture signal to generate predictive error macroblocks respectively. The subtracter 71 sequentially outputs the predictive error macroblocks to the DCT device 72. The DCT device 72 divides every predictive error macroblock into sub-blocks of 8 pixels by 8 pixels. The DCT device 72 subjects each sub-block to discrete cosine transform, thereby generating DCT coefficients. The DCT device 72 outputs the DCT coefficients to the quantizer 73.

The device 73 quantizes the DCT coefficients in response to a quantization scale factor to get quantized DCT coefficients. The quantization scale factor is notified by the code amount controller 90. The quantizer 73 outputs the quantized DCT coefficients to the variable-length encoder 75 and the inverse quantizer 77.

The variable-length encoder 75 converts the quantized DCT coefficients into words of the prescribed variable-length code. The variable-length encoder 75 sequentially outputs the variable-length code words to the buffer 76. The buffer 76 temporarily stores the variable-length code words before sequentially outputting them in properly-adjusted time base as an output bit stream.

The inverse quantizer 77 and the inverse DCT device 78 cooperate to implement local decoding. Specifically, the device 77 inversely quantizes the quantized DCT coefficients to recover the original DCT coefficients. The inverse quantizer 77 outputs the recovered DCT coefficients to the inverse DCT device 78. The device 78 subjects the recovered DCT coefficients to inverse discrete cosine transform, thereby recovering each original sub-block. The inverse DCT device 78 combines recovered sub-blocks into each decoded predictive error macroblock. The inverse DCT device 78 sequentially outputs the decoded predictive error macroblocks to the adder 80.

For every P picture represented by the input moving-picture signal, the device 80 adds the predictive macroblocks and the decoded predictive error macroblocks to generate decoded macroblocks (local decoded pictures). The adder 80 outputs the decoded macroblocks to the frame memory 81. The frame memory 81 stores the decoded macroblocks as an indication of a recovered P picture for later use.

For every B picture represented by the input moving-picture signal, the frame memory 81 outputs decoded macroblocks representative of a past I or P picture and a future I or P picture to the motion-compensated predictor 79. The motion-compensated predictor 79 implements motion vector detection and motion compensation in response to the macroblocks of the input moving-picture signal and the decoded macroblocks, thereby generating predictive macroblocks. The motion-compensated predictor 79 sequentially outputs the predictive macroblocks to the subtracter 71.

The device 71 subtracts the predictive macroblocks from the macroblocks of the input moving-picture signal to generate predictive error macroblocks respectively. The subtracter 71 sequentially outputs the predictive error macroblocks to the DCT device 72. The DCT device 72 divides every predictive error macroblock into sub-blocks of 8 pixels by 8 pixels. The DCT device 72 subjects each sub-block to discrete cosine transform, thereby generating DCT coefficients. The DCT device 72 outputs the DCT coefficients to the quantizer 73.

The device 73 quantizes the DCT coefficients in response to a quantization scale factor to get quantized DCT coefficients. The quantization scale factor is notified by the code amount controller 90. The quantizer 73 outputs the quantized DCT coefficients to the variable-length encoder 75.

The variable-length encoder 75 converts the quantized DCT coefficients into words of the prescribed variable-length code. The variable-length encoder 75 sequentially outputs the variable-length code words to the buffer 76. The buffer 76 temporarily stores the variable-length code words before sequentially outputting them in properly-adjusted time base as an output bit stream.

For every B picture represented by the input moving-picture signal, the inverse quantizer 77 and the inverse DCT device 78 are disabled so that local decoding is not performed.

For every I, P, or B picture represented by the input moving-picture signal, the buffer 76 continuously notifies the code amount controller 90 of the degree of its fullness. Conditions of the quantization by the quantizer 73 are notified to the code amount controller 90. The code amount controller 90 decides a quantization scale factor in response to the degree of the fullness of the buffer 76 and the conditions of the quantization by the quantizer 73. The code amount controller 90 notifies the decided quantization scale factor to the quantizer 73. The quantization scale factor is designed to implement generated code amount control, that is, generated bit number control.

MPEG-2 Test Model 5 relates to a fixed-bit-rate control method, that is, a method of maintaining a generated code amount (the number of generated bits) at a fixed value for every GOP (group of pictures). Normally, one GOP starts from an I picture and ends at a picture immediately preceding a next I picture. According to the fixed-bit-rate control method, a code amount (the number of bits) R allocated to one GOP is given as follows.

$$R=(BR/PR)\cdot N \quad (1)$$

where BR denotes a target bit rate, and PR denotes the number of frames per second and N denotes the number of frames in one GOP.

The code amount R is distributed among pictures composing one GOP. An actual code amount (the actual number of bits) generated for the latest encoded picture is measured. An average quantization scale factor is computed by averaging the actual quantization scale factors used for the encoding of macroblocks to get the latest encoded picture. The complexity Xi of the latest encoded I picture is estimated by multiplying the actual code amount for the latest encoded I picture and the average quantization scale factor for the latest encoded I picture. The complexity Xp of the latest encoded P picture is estimated by multiplying the actual code amount for the latest encoded P picture and the average quantization scale factor for the latest encoded P picture. The complexity Xb of the latest encoded B picture is estimated by multiplying the actual code amount for the latest encoded B picture and the average quantization scale factor for the latest encoded B picture.

When a picture in the current GOP which should be encoded next is an I picture, a target code amount (the target number of bits) Ti allocated to the next picture is given by equations (2A), (2B), and (2C) indicated later. When a picture in the current GOP which should be encoded next is a P picture, a target code amount (the target number of bits) Tp allocated to the next picture is given by equations (3A), (3B), and (3C) indicated later. When a picture in the current GOP which should be encoded next is a B picture, a target code amount (the target number of bits) Tb allocated to the next picture is given by equations (4A), (4B), and (4C) indicated below.

$$\text{I picture: } Ti = \text{MAX}[A, B] \quad (2A)$$

$$A = R/[1 + \{(Np \cdot Xp)/(Xi \cdot Kp)\} + \{(Nb \cdot Xb)/(Xi \cdot Kb)\}] \quad (2B)$$

$$B = BR/(8 \cdot PR) \quad (2C)$$

$$\text{P picture: } Tp = \text{MAX}[C, D] \quad (3A)$$

$$C = R/[Np + \{(Nb \cdot Kp \cdot Xb)/(Xp \cdot Kb)\}]. \quad (3B)$$

$$D = BR/(8 \cdot PR) \quad (3C)$$

$$\text{B picture: } Tb = \text{MAX}[E, F] \quad (4A)$$

$$E = R/[Nb + \{(Np \cdot Kb \cdot Xp)/(Xb \cdot Kp)\}] \quad (4B)$$

$$F = BR/(8 \cdot PR) \quad (4C)$$

where MAX denotes an operator of selecting the greatest one among members in the subsequent brackets; Kp and Kb are universal constants dependent on the quantization matrices and specifically denote the setting ratio of the quantization scale factor for a P picture to that for an I picture and the setting ratio of the quantization scale factor for a B picture to that for an I picture respectively; R denotes the remaining code amount (the remaining number of bits) allocated to the current GOP which is updated each time a picture is encoded; Np is the number of P pictures remaining in the current GOP and waiting to be encoded; and Nb is the number of B pictures remaining in the current GOP and waiting to be encoded. Specifically, the code amount (the number of bits) generated for the picture just encoded is subtracted from the remaining code amount R to update the latter. At the head of every GOP (that is, at a first I picture in every GOP), the value given by the equation (1) is added to the value R used in the equations (2A), (2B), (3A), (3B), (4A), and (4B).

The actual code amount (the actual number of bits) generated for a macroblock or macroblocks preceding the current macroblock is detected regarding the current picture. The degree of the fullness of an I-picture-related virtual buffer is computed on the basis of the detected code amount and the target code amount Ti. The degree of the fullness of a P-picture-related virtual buffer is computed on the basis of the detected code amount and the target code amount Tp. The degree of the fullness of a B-picture-related virtual buffer is computed on the basis of the detected code amount and the target code amount Tb. When the current macroblock is in an I picture, a reference quantization parameter used for the encoding of the current macroblock is decided in response to the computed degree of the fullness of the I-picture-related virtual buffer. When the current macroblock is in a P picture, the reference quantization parameter used for the encoding of the current macroblock is decided in response to the computed degree of the fullness of the P-picture-related virtual buffer. When the current macroblock is in a B picture, the reference quantization parameter used for the encoding of the current macroblock is decided in response to the computed degree of the fullness of the B-picture-related virtual buffer.

First Embodiment

Figure 3:
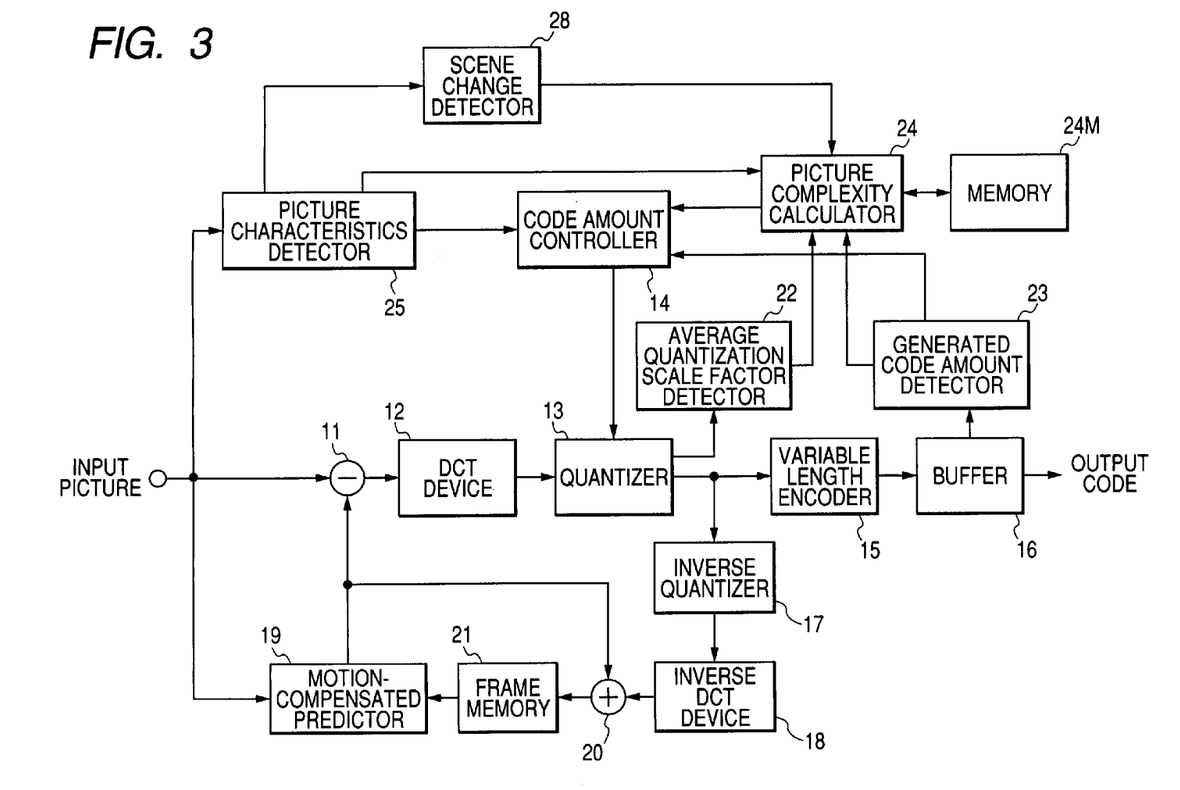
FIG. 3 is a block diagram of an apparatus for encoding a moving-picture signal according to a first embodiment of this invention.

FIG. 3 shows an apparatus for encoding a moving-picture signal according to a first embodiment of this invention. Every frame related to an input moving-picture signal is divided into macroblocks of 16 pixels by 16 pixels. The apparatus of FIG. 3 processes the input moving-picture signal on a macroblock-by-macroblock basis.

The input moving-picture signal represents a stream of pictures of three different types which include I pictures (intra-coded pictures), P pictures (forward predictive coded pictures), and B pictures (bidirectionally predictive coded pictures). Preferably, the order in which pictures are arranged is changed from the original to allow a proper encoding procedure including bidirectional prediction. The after-change order is referred to as the encoding order.

The apparatus of FIG. 3 includes a subtracter 11, a discrete cosine transform (DCT) device 12, a quantizer 13, a code amount controller 14, a variable-length encoder 15, a buffer (memory) 16, an inverse quantizer 17, an inverse DCT device 18, a motion-compensated predictor 19, an adder 20, and a frame memory 21. The apparatus of FIG. 3 further includes an average quantization scale factor detector 22, a generated code amount detector 23, a picture complexity calculator 24, a memory 24M, a picture characteristics detector 25, and a scene change detector 28.

A picture block divider (not shown) divides the input moving-picture signal into macroblocks for every frame. The macroblocks of the input moving-picture signal are sequentially applied to the subtracter 11, the motion-compensated predictor 19, and the picture characteristics detector 25. The subtracter 11 is successively followed by the DCT device 12, the quantizer 13, the variable-length encoder 15, and the buffer 16. The inverse quantizer 17 is connected with the quantizer 13. The inverse quantizer 17 is successively followed by the inverse DCT device 18, the adder 20, the frame memory 21, and the motion-compensated predictor 19. The motion-compensated predictor 19 is connected with the subtracter 11 and the adder 20. The code amount controller 14 is connected with the quantizer 13, the generated code amount detector 23, the picture complexity calculator 24, and the picture characteristics detector 25. The average quantization scale factor detector 22 is connected between the quantizer 13 and the picture complexity calculator 24. The generated code amount detector 23 is connected with the buffer 16 and the picture complexity calculator 24. The picture complexity calculator 24 is connected with the memory 24M, the picture characteristics detector 25, and the scene change detector 28. The picture characteristics detector 25 is connected with the scene change detector 28.

For every I picture represented by the input moving-picture signal, the subtracter 11 sequentially passes macroblocks of the input moving-picture signal to the DCT device 12 without processing them. The DCT device 12 divides every macroblock into sub-blocks of 8 pixels by 8 pixels. The DCT device 12 subjects each sub-block to discrete cosine transform (orthogonal transform), thereby generating DCT coefficients. The DCT device 12 outputs the DCT coefficients to the quantizer 13.

The device 13 quantizes the DCT coefficients in response to a quantization scale factor to get quantized DCT coefficients. The quantization scale factor is notified by the code amount controller 14. The quantizer 13 outputs the quantized DCT coefficients to the variable-length encoder 15 and the inverse quantizer 17.

The variable-length encoder 15 converts the quantized DCT coefficients into words of a prescribed variable-length code. The variable-length encoder 15 sequentially outputs the variable-length code words to the buffer 16. The buffer 16 temporarily stores the variable-length code words before sequentially outputting them in properly-adjusted time base as an output bit stream.

The inverse quantizer 17 and the inverse DCT device 18 cooperate to implement local decoding. Specifically, the device 17 inversely quantizes the quantized DCT coefficients to recover the original DCT coefficients. The inverse quantizer 17 outputs the recovered DCT coefficients to the inverse DCT device 18. The device 18 subjects the recovered DCT coefficients to inverse discrete cosine transform, thereby recovering each original sub-block. The inverse DCT device 18 combines recovered sub-blocks into each decoded macroblock (each local decoded picture). The inverse DCT device 18 sequentially outputs the decoded macroblocks to the adder 20.

For every I picture represented by the input moving-picture signal, the adder 20 passes the decoded macroblocks to the frame memory 21 without processing them. The frame memory 21 stores the decoded macroblocks as an indication of a recovered I picture for later use.

For every P picture represented by the input moving-picture signal, the frame memory 21 outputs decoded macroblocks representative of a past I picture or a past P picture to the motion-compensated predictor 19. The motion-compensated predictor 79 implements motion vector detection and motion compensation in response to the macroblocks of the input moving-picture signal and the decoded macroblocks, thereby generating predictive macroblocks. The motion-compensated predictor 79 sequentially outputs the predictive macroblocks to the subtracter 11 and the adder 20.

The device 11 subtracts the predictive macroblocks from the macroblocks of the input moving-picture signal to generate predictive error macroblocks respectively. The subtracter 11 sequentially outputs the predictive error macroblocks to the DCT device 12. The DCT device 12 divides every predictive error macroblock into sub-blocks of 8 pixels by 8 pixels. The DCT device 12 subjects each sub-block to discrete cosine transform (orthogonal transform), thereby generating DCT coefficients. The DCT device 12 outputs the DCT coefficients to the quantizer 13.

The device 13 quantizes the DCT coefficients in response to a quantization scale factor to get quantized DCT coefficients. The quantization scale factor is notified by the code amount controller 14. The quantizer 13 outputs the quantized DCT coefficients to the variable-length encoder 15 and the inverse quantizer 17.

The variable-length encoder 15 converts the quantized DCT coefficients into words of the prescribed variable-length code. The variable-length encoder 15 sequentially outputs the variable-length code words to the buffer 16. The buffer 16 temporarily stores the variable-length code words before sequentially outputting them in properly-adjusted time base as an output bit stream.

The inverse quantizer 17 and the inverse DCT device 18 cooperate to implement local decoding. Specifically, the device 17 inversely quantizes the quantized DCT coefficients to recover the original DCT coefficients. The inverse quantizer 17 outputs the recovered DCT coefficients to the inverse DCT device 18. The device 18 subjects the recovered DCT coefficients to inverse discrete cosine transform, thereby recovering each original sub-block. The inverse DCT device 18 combines recovered sub-blocks into each decoded predictive error macroblock. The inverse DCT device 18 sequentially outputs the decoded predictive error macroblocks to the adder 20.

For every P picture represented by the input moving-picture signal, the device 20 adds the predictive macroblocks and the decoded predictive error macroblocks to generate decoded macroblocks (local decoded pictures). The adder 20 outputs the decoded macroblocks to the frame memory 21. The frame memory 21 stores the decoded macroblocks as an indication of a recovered P picture for later use.

For every B picture represented by the input moving-picture signal, the frame memory 21 outputs decoded macroblocks representative of a past I or P picture and a future I or P picture to the motion-compensated predictor 19. The motion-compensated predictor 19 implements motion vector detection and motion compensation in response to the macroblocks of the input moving-picture signal and the decoded macroblocks, thereby generating predictive macroblocks. The motion-compensated predictor 19 sequentially outputs the predictive macroblocks to the subtracter 11.

The device 11 subtracts the predictive macroblocks from the macroblocks of the input moving-picture signal to generate predictive error macroblocks respectively. The subtracter 11 sequentially outputs the predictive error macroblocks to the DCT device 12. The DCT device 12 divides every predictive error macroblock into sub-blocks of 8 pixels by 8 pixels. The DCT device 12 subjects each sub-block to discrete cosine transform (orthogonal transform), thereby generating DCT coefficients. The DCT device 12 outputs the DCT coefficients to the quantizer 13.

The device 13 quantizes the DCT coefficients in response to a quantization scale factor to get quantized DCT coefficients. The quantization scale factor is notified by the code amount controller 14. The quantizer 13 outputs the quantized DCT coefficients to the variable-length encoder 15.

The variable-length encoder 15 converts the quantized DCT coefficients into words of the prescribed variable-length code. The variable-length encoder 15 sequentially outputs the variable-length code words to the buffer 16. The buffer 16 temporarily stores the variable-length code words before sequentially outputting them in properly-adjusted time base as an output bit stream.

For every B picture represented by the input moving-picture signal, the inverse quantizer 17 and the inverse DCT device 18 are disabled so that local decoding is not performed.

For every I, P, or B picture represented by the input moving-picture signal, the quantizer 13 notifies the average scale factor detector 22 of an actually-used quantization scale factor for each macroblock. The average scale factor detector 22 computes an average quantization scale factor for one frame (the frame just encoded) by averaging the actually-used quantization scale factors for the respective macroblocks composing the frame. The average scale factor detector 22 notifies the picture complexity calculator 24 of the computed average quantization scale factor for one frame (the frame just encoded).

For every I, P, or B picture represented by the input moving-picture signal, the buffer 16 monitors the instant code amount (the instant number of bits) generated by the variable-length encoder 15. The buffer 16 notifies the generated code amount detector 23 of the monitored instant code amount. The generated code amount detector 23 accumulates or integrates the monitored instant code amount to detect a generated code amount for one frame (the frame just encoded), that is, the number of bits generated for one frame. The generated code amount detector 23 notifies the picture complexity calculator 24 of the generated code amount for one frame (the frame just encoded). In addition, the generated code amount detector 23 notifies the result of a part of the accumulation or the integration to the code amount controller 14 at every timing which corresponds to one macroblock.

Specifically, the buffer 16 monitors the code amount (the instant number of bits) generated by the variable-length encoder 15 for every macroblock. The buffer 16 notifies the generated code amount detector 23 of the monitored per-macroblock code amount. Regarding the current picture, the generated code amount detector 23 adds the monitored code amounts of all macroblocks preceding the current macroblock to get a current macroblock-based intra-picture code amount. The generated code amount detector 23 notifies the code amount controller 14 of the current macroblock-based intra-picture code amount. In addition, the generated code amount detector 23 adds the monitored code amounts of all the macroblocks composing the frame just encoded to detect a generated code amount for one frame (the frame just encoded), that is, the number of bits generated for one frame. The generated code amount detector 23 notifies the picture complexity calculator 24 of the generated code amount for one frame (the frame just encoded).

The picture complexity calculator 24 multiplies the computed average quantization scale factor for the just-encoded frame and the generated code amount for the just-encoded frame, and subjects the result of the multiplication to a prescribed operation to obtain the actual complexity of the just-encoded frame or the complexity of a picture of the type same as the just-encoded frame type. The result of the multiplication may be directly used as the actual complexity of the just-encoded frame or the complexity of a picture of the type same as the just-encoded frame type. When the just-encoded frame is an I picture, the obtained actual complexity is of an I picture and is denoted by Xi-p. When the just-encoded frame is a P picture, the obtained actual complexity is of a P picture and is denoted by Xp-p. When the just-encoded frame is a B picture, the obtained actual complexity is of a B picture and is denoted by Xb-p. The complexity Xi-p of an I picture, the complexity Xp-p of a P picture, and the complexity Xb-p of a B picture correspond to those defined in MPEG-2 Test Model 5. The picture complexity calculator 24 stores information of the complexity Xi-p of an I picture, the complexity Xp-p of a P picture, and the complexity Xb-p of a B picture into the memory 24M. The actual I-picture complexity Xi-p, the actual P-picture complexity Xp-p, and the actual B-picture complexity Xb-p represented by the information in the memory 24M are updated from time to time.

The picture characteristics detector 25 detects the activity of each macroblock of the input moving-picture signal which is a parameter representing picture characteristics of each macroblock. The picture characteristics detector 25 adds the detected activities of the respective macroblocks in one frame to get a per-frame activity. When the current frame is an I picture, the per-frame activity is of an I picture and is denoted by ACTi. When the current frame is a P picture, the per-frame activity is of a P picture and is denoted by ACTp. When the current frame is a B picture, the per-frame activity is of a B picture and is denoted by ACTb. The picture characteristics detector 25 notifies the picture complexity calculator 24 and the scene change detector 28 of the per-frame activity of the current picture.

Regarding every frame, the picture characteristics detection performed by the device 25 precedes the actual encoding. Thus, the per-frame activity notified to the picture complexity calculator 24 and the scene change detector 28 from the device 25 is of a picture to be encoded next. Preferably, the parameter representing the picture characteristics is the dispersion of luminance values or the difference between pixels. The parameter may be selected from other factors.

The picture complexity calculator 24 uses the per-frame activity notified by the picture characteristics detector 25. In addition, the picture complexity calculator 24 stores information of the per-frame activity into the memory 24M for later use.

The scene change detector 28 uses the per-frame activity notified by the picture characteristics detector 25. The scene change detector 28 includes a memory which stores information representing the per-frame activities of the latest encoded I, P, and B pictures.

When the next encoded picture is an I picture, the scene change detector 28 calculates the ratio between the per-frame activity ACTi of the next encoded picture and the per-frame activity ACTi-p of the latest encoded I picture. Preferably, the calculated ratio is given as ACTi/ACTi-p. The scene change detector 28 decides whether or not the calculated ratio ACTi/ACTi-p resides in a predetermined range between a prescribed lower limit Amin and a prescribed higher limit Amax. Preferably, the prescribed lower limit Amin is greater than "0" but smaller than "1". The prescribed higher limit Amax is greater than "1". When the calculated ratio ACTi/ACTi-p does not resides in the predetermined range, that is, when the calculated ratio ACTi/ACTi-p is smaller than the prescribed lower limit Amin or greater than the prescribed higher limit Amax, the scene change detector 28 recognizes that a scene change occurs between frames corresponding to the next encoded picture and the latest encoded I picture. In this case, the scene change detector 28 sends information representative of the time positions of these frames to the picture complexity calculator 24. The next encoded picture is referred to as a scene-change-corresponding picture. On the other hand, when the calculated ratio ACTi/ACTi-p resides in the predetermined range, that is, when the calculated ratio ACTi/ACTi-p is between the prescribed lower limit Amin and the prescribed higher limit Amax, the scene change detector 28 recognizes that a scene change does not occur between frames corresponding to the next encoded picture and the latest encoded I picture. In this case, the scene change detector 28 does not send any information to the picture complexity calculator 24.

When the next encoded picture is a P picture, the scene change detector 28 calculates the ratio between the per-frame activity ACTp of the next encoded picture and the per-frame activity ACTp-p of the latest encoded P picture. Preferably, the calculated ratio is given as ACTp/ACTp-p. The scene change detector 28 decides whether or not the calculated ratio ACTp/ACTp-p resides in the predetermined range between the prescribed lower limit Amin and the prescribed higher limit Amax. When the calculated ratio ACTp/ACTp-p does not resides in the predetermined range, the scene change detector 28 recognizes that a scene change occurs between frames corresponding to the next encoded picture and the latest encoded P picture. In this case, the scene change detector 28 sends information representative of the time positions of these frames to the picture complexity calculator 24. The next encoded picture is referred to as a scene-change-corresponding picture. On the other hand, when the calculated ratio ACTp/ACTp-p resides in the predetermined range, the scene change detector 28 recognizes that a scene change does not occur between frames corresponding to the next encoded picture and the latest encoded P picture. In this case, the scene change detector 28 does not send any information to the picture complexity calculator 24.

When the next encoded picture is a B picture, the scene change detector 28 calculates the ratio between the per-frame activity ACTb of the next encoded picture and the per-frame activity ACTb-p of the latest encoded B picture. Preferably, the calculated ratio is given as ACTb/ACTb-p. The scene change detector 28 decides whether or not the calculated ratio ACTb/ACTb-p resides in the predetermined range between the prescribed lower limit Amin and the prescribed higher limit Amax. When the calculated ratio ACTb/ACTb-p does not resides in the predetermined range, the scene change detector 28 recognizes that a scene change occurs between frames corresponding to the next encoded picture and the latest encoded B picture. In this case, the scene change detector 28 sends information representative of the time positions of these frames to the picture complexity calculator 24. The next encoded picture is referred to as a scene-change-corresponding picture. On the other hand, when the calculated ratio ACTb/ACTb-p resides in the predetermined range, the scene change detector 28 recognizes that a scene change does not occur between frames corresponding to the next encoded picture and the latest encoded B picture. In this case, the scene change detector 28 does not send any information to the picture complexity calculator 24.

When a scene change occurs, the picture complexity calculator 24 starts the estimation of the complexity of the next encoded picture (the scene-change-corresponding picture) in response to the information sent from the scene change detector 28 and representing the time positions of the frames between which the scene change occurs. Then, the picture complexity calculator 24 carries out the estimation of the complexity of the next encoded picture. The estimated picture complexity is designed to enhance the quality of the encoding-resultant picture originating from the scene-change-corresponding picture.

In more detail, when a scene change occurs and the next encoded picture (the scene-change-corresponding picture) is an I picture, the picture complexity calculator 24 computes the estimated I-picture complexity Xi from the newest actual I-picture complexity Xi-p. For example, the estimated I-picture complexity Xp is set to the newest actual I-picture complexity Xi-p. Information of the newest actual I-picture complexity Xi-p is read out from the memory 24M. When a scene change occurs and the next encoded picture (the scene-change-corresponding picture) is a P picture, the picture complexity calculator 24 computes the estimated P-picture complexity Xp from the newest actual I-picture complexity Xi-p rather than the newest actual P-picture complexity Xp-p. For example, the estimated P-picture complexity Xp is set to the newest actual I-picture complexity Xi-p. Information of the newest actual I-picture complexity Xi-p is read out from the memory 24. When a scene change occurs and the next encoded picture (the scene-change-corresponding picture) is a B picture, the picture complexity calculator 24 computes the estimated B-picture complexity Xb from the newest actual P-picture complexity Xp-p rather than the newest actual B-picture complexity Xb-p. For example, the estimated B-picture complexity Xb is set to the newest actual P-picture complexity Xp-p. Information of the newest actual P-picture complexity Xp-p is read out from the memory 24. In general, a scene change increases the number of intra-coded macroblocks in a subsequent P picture. An I picture is composed of intra-coded macroblocks only. Thus, the use of the actual I-picture complexity Xi-p for the computation of the estimated P-picture complexity Xp is reasonable and causes a good quality of the encoding-resultant picture originating from the scene-change-corresponding picture. In general, a scene change causes bidirectional prediction to be less dominant over a subsequent B picture. A P picture is encoded without bidirectional prediction. Thus, the use of the actual P-picture complexity Xp-p for the computation of the estimated B-picture complexity Xb is reasonable and causes a good quality of the encoding-resultant picture originating from the scene-change-corresponding picture.

On the other hand, when a scene change does not occur and the next encoded picture is an I picture, the picture complexity calculator 24 computes the estimated I-picture complexity Xi from the newest actual I-picture complexity Xi-p. For example, the estimated I-picture complexity Xp is set to the newest actual I-picture complexity Xi-p. Information of the newest actual I-picture complexity Xi-p is read out from the memory 24M. When a scene change does not occur and the next encoded picture is a P picture, the picture complexity calculator 24 computes the estimated P-picture complexity Xp from the newest actual P-picture complexity Xp-p. For example, the estimated P-picture complexity Xp is set to the newest actual P-picture complexity Xp-p. Information of the newest actual P-picture complexity Xp-p is read out from the memory 24M. When a scene change does not occur and the next encoded picture is a B picture, the picture complexity calculator 24 computes the estimated B-picture complexity Xb from the newest actual B-picture complexity Xb-p. For example, the estimated B-picture complexity Xb is set to the newest actual B-picture complexity Xb-p. Information of the newest actual B-picture complexity Xb-p is read out from the memory 24M.

In the case where the scene-change-corresponding picture is a P picture, the picture complexity calculator 24 computes the estimated complexity Xp of a first P picture following the scene-change-corresponding picture according to an equation expressed as:

$$Xp = Xp\text{-}pold \cdot (ACTp/ACTp\text{-}pold) \qquad (5)$$

where Xp-pold denotes the actual P-picture complexity which is stored in the memory 24M at the time corresponding to the scene-change-corresponding picture; ACTp-pold denotes the activity of the past P picture corresponding to the actual P-picture complexity Xp-pold; and ACTp denotes the activity of the next encoded P picture (that is, the first P picture following the scene-change-corresponding picture). The equation (5) prevents the estimated P-picture complexity Xp from being excessively large. Information of the actual P-picture complexity Xp-pold is read out from the memory 24M. Information of the activity ACTp-pold of the past P picture is read out from the memory 24M. Information of the activity ACTp of the next encoded P picture is sent from the picture characteristics detector 25.

In the case where the scene-change-corresponding picture is a B picture, the picture complexity calculator 24 computes the estimated complexity Xb of a first B picture following the scene-change-corresponding picture according to an equation expressed as:

$$Xb = Xb\text{-}pold \cdot (ACTb/ACTb\text{-}pold) \qquad (6)$$

where Xb-pold denotes the actual B-picture complexity which is stored in the memory 24M at the time corresponding to the scene-change-corresponding picture; ACTb-pold denotes the activity of the past B picture corresponding to the actual B-picture complexity Xb-pold; and ACTb denotes the activity of the next encoded B picture (that is, the first B picture following the scene-change-corresponding picture). The equation (6) prevents the estimated B-picture complexity Xb from being excessively large. Information of the actual B-picture complexity Xb-pold is read out from the memory 24M. Information of the activity ACTb-pold of the past B picture is read out from the memory 24M. Information of the activity ACTb of the next encoded B picture is sent from the picture characteristics detector 25.

As previously described, for a scene-change-corresponding P picture, the picture complexity calculator 24 computes the estimated P-picture complexity Xp by using the actual I-picture complexity Xi-p. Specifically, the picture complexity calculator 24 uses the actual I-picture complexity Xi-p as the estimated P-picture complexity Xp. For a scene-change-corresponding B picture, the picture complexity calculator 24 computes the estimated B-picture complexity Xb by using the actual P-picture complexity Xp-p. Specifically, the picture complexity calculator 24 uses the actual P-picture complexity Xp-p as the estimated B-picture complexity Xb. For a first P picture following a scene-change-corresponding P picture, the picture complexity calculator 24 computes the estimated P-picture complexity Xp by referring to the equation (5). For a first B picture following a scene-change-corresponding B picture, the picture complexity calculator 24 computes the estimated B-picture complexity Xb by referring to the equation (6). For other I, P, and B pictures, the picture complexity calculator 24 uses the actual I-picture complexity Xi-p, the actual P-picture complexity Xp-p, and the actual B-picture complexity Xb-p as the estimated I-picture complexity Xi, the estimated P-picture complexity Xp, and the estimated B-picture complexity Xb respectively. The picture complexity calculator 24 notifies the estimated I-picture complexity Xi, the estimated P-picture complexity Xp, and the estimated B-picture complexity Xb to the code amount controller 14.

The code amount controller 14 is designed according to MPEG-2 Test Model 5. The code amount controller 14 computes a target code amount Ti allocated to a next encoded I picture, a target code amount Tp allocated to a next encoded P picture, and a target code amount Tb allocated to a next encoded B picture by referring to the previously-indicated equations (2A)-(2C), (3A)-(3C), and (4A)-(4C) while substituting the values of the estimated I-picture complexity Xi, the estimated P-picture complexity Xp, and the estimated B-picture complexity Xb into the terms Xi, Xp, and Xb therein. By the technique in MPEG-2 Test Model 5, the code amount controller 14 decides a quantization scale factor for the current macroblock on the basis of the target code amount Ti, Tp, or Tb and the current macroblock-based intra-picture code amount. The current macroblock-based intra-picture code amount is notified by the generated code amount detector 23. As previously mentioned, the current macroblock-based intra-picture code amount results from adding the monitored code amounts of all macroblocks preceding the current macroblock regarding the current picture. The code amount controller 14 notifies the quantizer 13 of the decided quantization scale factor for the current macroblock.

The picture characteristics detector 25 notifies the per-frame activity (ACTi, ACTp, or ACTb) of the current picture also to the code amount controller 14. The code amount controller 14 adjusts the quantization scale factor for each macroblock in response to the per-frame activity to implement adaptive quantization defined in MPEG-2 Test Model 5. It should be noted that the adaptive quantization may be omitted.

The device 13 quantizes the DCT coefficients of the current macroblock (a macroblock in an I picture or a predictive error macroblock for a P picture or a B picture) in response to the quantization scale factor notified by the code amount controller 14. The variable-length encoder 15 converts the result of the quantization into words of the prescribed variable-length code. The variable-length encoder 15 sequentially outputs the variable-length code words to the buffer 16. The buffer 16 temporarily stores the variable-length code words before sequentially outputting them in properly-adjusted time base as an output bit stream. The quantization scale factor for each macroblock is notified from the quantizer 13 to the average quantization scale factor detector 22. The generated code amount monitored by the buffer 16 is notified to the code amount detector 23. The per-macroblock quantization scale factor notified to the average quantization scale factor detector 22, and the generated code amount notified to the code amount detector 23 are used in code amount control for the next picture to be encoded.

Second Embodiment

Figure 4:
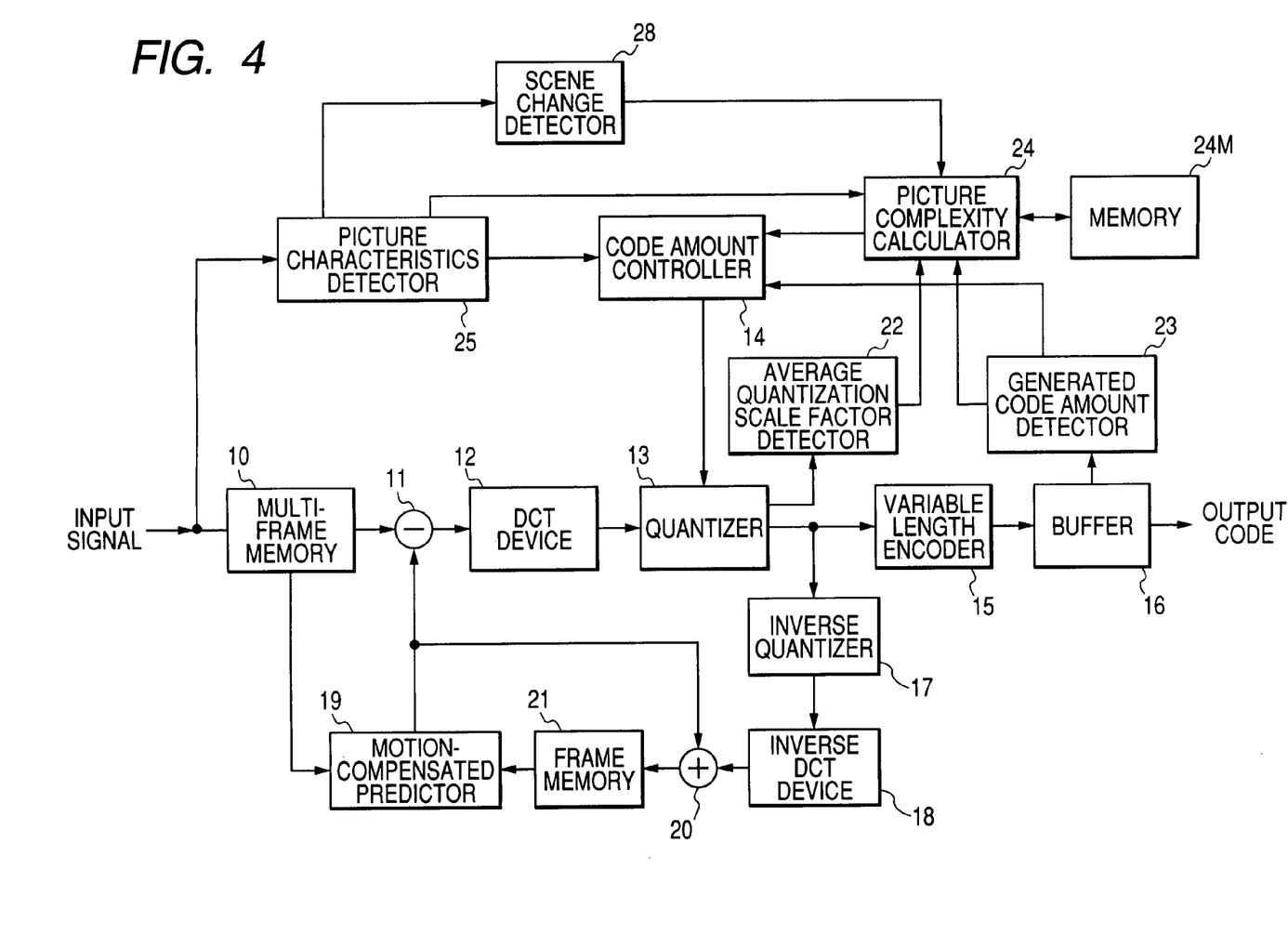
FIG. 4 is a block diagram of an apparatus for encoding a moving-picture signal according to a second embodiment of this invention.

FIG. 4 shows an apparatus for encoding a moving-picture signal according to a second embodiment of this invention. The apparatus of FIG. 4 is similar to the apparatus of FIG. 3 except for design changes described hereafter. In the apparatus of FIG. 4, the scene change detection precedes the actual encoding with respect to every frame.

The apparatus of FIG. 4 includes a multi-frame memory 10 followed by the subtracter 11 and the motion-compensated predictor 19. A first input moving-picture signal is fed to the multi-frame memory 10 and the picture characteristics detector 25. The first input moving-picture signal represents a stream of pictures arranged in the original order.

The multi-frame memory 10 sequentially stores 1-frame-corresponding segments of the first input moving-picture signal before outputting them in the encoding order to form a second input moving-picture signal. In other words, the multi-frame memory 10 rearranges 1-frame-corresponding segments of the first input moving-picture signal in the encoding order to form the second input moving-picture signal. Thus, the order in which pictures are arranged is changed from the original to allow a proper encoding procedure including bidirectional prediction. The after-change order is the encoding order. The multi-frame memory 10 feeds the second input moving-picture signal to the subtracter 11 and the motion-compensated predictor 19.

The picture characteristics detector 25 detects the activity of each macroblock of the first input moving-picture signal. The picture characteristics detector 25 adds the detected activities of the respective macroblocks in one frame to get a per-frame activity ACT. When the current frame is an I picture, the per-frame activity is of an I picture and is denoted by ACTi. When the current frame is a P picture, the per-frame activity is of a P picture and is denoted by ACTp. When the current frame is a B picture, the per-frame activity is of a B picture and is denoted by ACTb. The picture characteristics detector 25 notifies the per-frame activity of the current picture to the code amount controller 14, the picture complexity calculator 24, and the scene change detector 28. The picture complexity calculator 24 stores information of the per-frame activity of the current picture into the memory 25M for later use by code amount calculation.

The scene change detector 28 calculates the ratio between the per-frame activity ACT of the current picture and the per-frame activity ACT-p of the picture immediately preceding the current picture. Preferably, the calculated ratio is given as ACT/ACT-p. The scene change detector 28 decides whether or not the calculated ratio ACT/ACT-p resides in a predetermined range between a prescribed lower limit Amin and a prescribed higher limit Amax. Preferably, the prescribed lower limit Amin is greater than "0" but smaller than "1". The prescribed higher limit Amax is greater than "1". When the calculated ratio ACT/ACT-p does not resides in the predetermined range, that is, when the calculated ratio ACT/ACT-p is smaller than the prescribed lower limit Amin or greater than the prescribed higher limit Amax, the scene change detector 28 recognizes that a scene change occurs between the current picture and the immediately-preceding picture. In this case, the scene change detector 28 sends information representative of the time positions of these frames to the picture complexity calculator 24. The current picture is referred to as a scene-change-corresponding picture. On the other hand, when the calculated ratio ACT/ACT-p resides in the predetermined range, that is, when the calculated ratio ACT/ACT-p is between the prescribed lower limit Amin and the prescribed higher limit Amax, the scene change detector 28 recognizes that a scene change does not occur between the current picture and the immediately-preceding picture. In this case, the scene change detector 28 does not send any information to the picture complexity calculator 24.

The picture complexity calculator 24 stores, into the memory 24M, the information representative of the time positions of the frames between which the scene change occurs. When a subsequent I or P picture is encoded, the picture complexity calculator 24 accesses the memory 24M to refer to the information representative of the time positions of the frames between which the scene change occurs.

Figure 5:
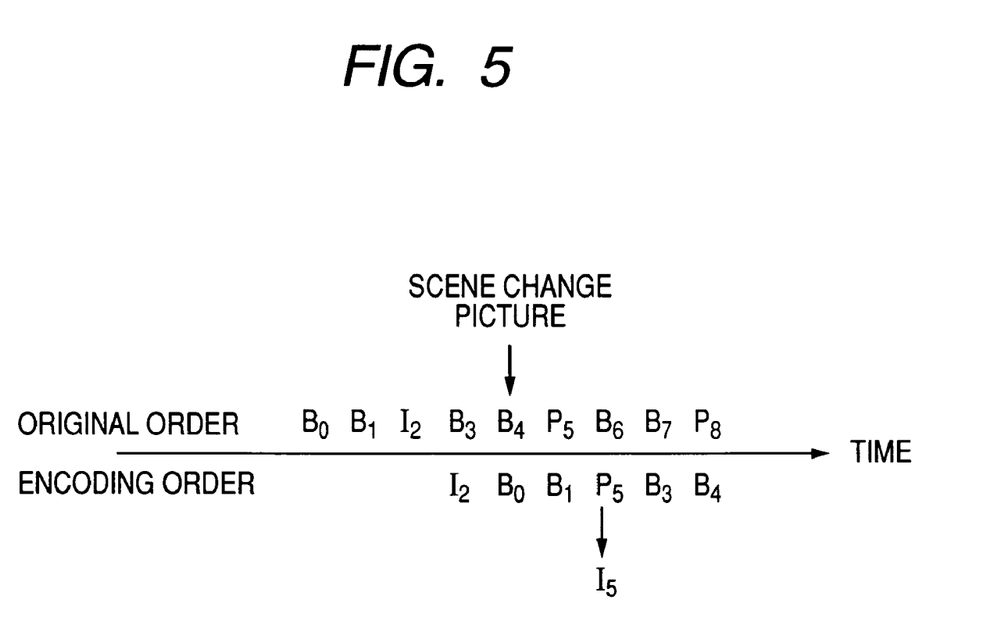
FIG. 5 is a time-domain diagram of pictures arranged in an original order and pictures arranged in an encoding order.

With reference to FIG. 5, pictures represented by the first input moving-picture signal are arranged in the original order as "$B_0, B_1, I_2, B_3, B_4, P_5, B_6, B_7, P_8$" where B, I, and P denote B, I, and P pictures respectively. The multi-frame memory 10 converts the first input moving-picture signal into the second input moving-picture signal through the rearrangement of pictures in the encoding order. Pictures represented by the second input moving-picture signal are arranged in the encoding order as "$I_2, B_0, B_1, P_5, B_3, B_4$". In FIG. 5, the picture $B_4$ represented by the first input moving-picture signal is a scene-change-corresponding picture. Thus, the scene change detector 28 sends information representative of the time positions of the pictures $B_3$ and $B_4$ to the picture complexity calculator 24. The picture complexity calculator 24 refers to this information at a later stage when the picture $P_5$ represented by the second input moving-picture signal is encoded. Thus, the picture $P_5$ is regarded as a scene-change-corresponding picture during the encoding. In addition, the picture $P_5$ is handled as a picture $I_5$ (an I picture).

When a scene change occurs, the picture complexity calculator 24 starts the estimation of the complexity of the next encoded picture (the scene-change-corresponding picture) in response to the information representing the time positions of the frames between which the scene change occurs. Then, the picture complexity calculator 24 carries out the estimation of the complexity of the next encoded picture. The estimated picture complexity is designed to enhance the quality of the encoding-resultant picture originating from the scene-change-corresponding picture.

In more detail, when a scene change occurs and the next encoded picture (the scene-change-corresponding picture) is a P picture, the picture complexity calculator 24 computes the estimated P-picture complexity Xp from the newest actual I-picture complexity Xi-p rather than the newest actual P-picture complexity Xp-p. For example, the estimated P-picture complexity Xp is set to the newest actual I-picture complexity Xi-p. When a scene change occurs and the next encoded picture (the scene-change-corresponding picture) is a B picture, the picture complexity calculator 24 computes the estimated B-picture complexity Xb from the newest actual P-picture complexity Xp-p rather than the newest actual B-picture complexity Xb-p. For example, the estimated B-picture complexity Xb is set to the newest actual P-picture complexity Xp-p. In general, a scene change increases the number of intra-coded macroblocks in a subsequent P picture. An I picture is composed of intra-coded macroblocks only. Thus, the use of the actual I-picture complexity Xi-p for the computation of the estimated P-picture complexity Xp is reasonable and causes a good quality of the encoding-resultant picture originating from the scene-change-corresponding picture. In general, a scene change causes bidirectional prediction to be less dominant over a subsequent B picture. A P picture is encoded without bidirectional prediction. Thus, the use of the actual P-picture complexity Xp-p for the computation of the estimated B-picture complexity Xb is reasonable and causes a good quality of the encoding-resultant picture originating from the scene-change-corresponding picture.

The picture complexity calculator 24 computes the estimated complexity Xb of one or more B pictures immediately following the scene-change-corresponding picture by use of the actual P-picture complexity Xp-pold which occurs immediately before the encoding of the scene-change-corresponding picture. For example, the estimated B-picture complexity Xb is set to the actual P-picture complexity Xp-pold. In general, a scene change causes bidirectional prediction to be less dominant over a subsequent B picture. A P picture is encoded without bidirectional prediction. Thus, the use of the actual P-picture complexity Xp-pold for the computation of the estimated B-picture complexity Xb is reasonable and causes a good quality of the encoding-resultant picture originating from the B picture or the B pictures immediately following the scene-change-corresponding picture.

In general, the number of intra-coded macroblocks in a scene-change-corresponding picture is relatively large. Accordingly, a scene-change-corresponding picture being originally a P picture may be changed to an I picture when being encoded.

Third Embodiment

According to a third embodiment of this invention, there is provided an apparatus for encoding an interlaced moving-picture signal. The apparatus in the third embodiment of this invention is similar to the apparatus of FIG. 4 except for design changes described hereafter. In the third embodiment of this invention, the scene change detector 28 (see FIG. 4) includes a motion detector.

Every interlaced frame is composed of two fields, that is, odd and even fields. The picture characteristics detector 25 calculates the activity FRMACT of every frame related to the first input moving-picture signal (the interlaced moving-picture signal). Specifically, the picture characteristics detector 25 computes the activities of respective macroblocks in every frame, and sums up the computed activities to get the activity FRMACT of the frame. In this case, every macroblock is handled as a group of 16 by 16 pixels. The picture characteristics detector 25 also calculates the sum FLDACT of the activities of odd and even fields in every frame related to the first input moving-picture signal. Specifically, the picture characteristics detector 25 divides every macroblock of 16 by 16 pixels into a half macroblock of 16 by 8 pixels in an odd filed and a half macroblock of 16 by 8 pixels in an even field. Then, the picture characteristics detector 25 computes the activities of respective half macroblocks in the odd field, and sums up the computed activities to get the activity of the odd field. In addition, the picture characteristics detector 25 computes the activities of respective half macroblocks in the even field, and sums up the computed activities to get the activity of the even field. Subsequently, the picture characteristics detector 25 adds the computed activity of the odd field and the computed activity of the even field to get the two-field-related activity FLDACT (that is, the sum FLDACT of the activities of odd and even fields in every frame). In this case, every macroblock is handled as two groups of 16 by 8 pixels. The picture characteristics detector 25 notifies the scene change detector 28 of the calculated frame-related activity FRMACT and the calculated two-field-related activity FLDACT.

In the case of a picture which is moving, the calculated frame-related activity FRMACT tends to be large while the calculated two-field-related activity FLDACT tends to be small. On the other hand, in the case of a stationary picture, the calculated frame-related activity FRMACT and the calculated two-field-related activity FLDACT tend to be similar. These conditions are utilized by the motion detector in the scene change detector 28.

The motion detector in the scene change detector 28 computes the ratio between the frame-related activity FRMACT and the two-field-related activity FLDACT for every frame. Preferably, the computed ratio is given as FRMACT/FLDACT. The motion detector decides whether or not the computed ratio is in a predetermined reference range. When the computed ratio is not in the predetermined reference range, the motion detector decides that the current picture is moving. On the other hand, when the computed ratio is in the predetermined reference range, the motion detector decides that the current picture is stationary. In more detail, the motion detector compares the computed ratio with a predetermined reference value. When the computed ratio is greater than the predetermined reference value, the motion detector decides that the current picture is moving. On the other hand, when the computed ratio is equal to or smaller than the predetermined reference value, the motion detector decides that the current picture is stationary. The motion detector feeds the picture complexity calculator 24 with motion-related information representing whether the current picture is moving or stationary.

The picture complexity calculator 24 responds to the motion-related information. In the case where the next encoded picture is a P picture, the picture complexity calculator 24 refers to the motion-related information and thereby decides whether both the next encoded picture and a reference picture for the next encoded picture are moving or stationary. When both the next encoded picture and a reference picture for the next encoded picture are moving or when both the next encoded picture and a reference picture for the next encoded picture are stationary, the picture complexity calculator 24 computes the estimated complexity Xp of the next encoded picture by use of the actual P-picture complexity Xp-p. Otherwise, the picture complexity calculator 24 computes the estimated complexity Xp of the next encoded picture by use of the actual I-picture complexity Xi-p as in the first embodiment of this invention. In the case where the next encoded picture is a B picture, the picture complexity calculator 24 refers to the motion-related information and thereby decides whether both the next encoded picture and a reference picture for the next encoded picture are moving or stationary. When both the next encoded picture and a reference picture for the next encoded picture are moving or when both the next encoded picture and a reference picture for the next encoded picture are stationary, the picture complexity calculator 24 computes the estimated complexity Xb of the next encoded picture by use of the actual B-picture complexity Xb-p. Otherwise, the picture complexity calculator 24 computes the estimated complexity Xb of the next encoded picture by use of the actual P-picture complexity Xp-p as in the first embodiment of this invention.

As understood from the above description, the actual I-picture complexity Xi-p is used for the computation of the estimated complexity Xp of the next encoded P picture in which the number of intra-coded macroblocks is expected to be relatively large. An I picture is composed of intra-coded macroblocks only. Thus, the use of the actual I-picture complexity Xi-p for the computation of the estimated P-picture complexity Xp is reasonable and causes a good quality of the encoding-resultant picture originating from the above-indicated next encoded P picture. As understood from the above description, the actual P-picture complexity Xp-p is used for the computation of the estimated complexity Xb of the next encoded B picture over which bidirectional prediction is expected to be less dominant. A P picture is encoded without bidirectional prediction. Thus, the use of the actual P-picture complexity Xp-p for the computation of the estimated B-picture complexity Xb is reasonable and causes a good quality of the encoding-resultant picture originating from the above-indicated next encoded B picture.

What is claimed is:

1. An apparatus for encoding a moving-picture signal, comprising:
first means for generating motion-compensated predictive errors of input moving pictures of plural different types;
second means for subjecting the input moving pictures and the motion-compensated predictive errors generated by the first means to orthogonal transform to generate transform-resultant coefficients;
third means for quantizing the transform-resultant coefficients generated by the second means in response to a variable quantization scale factor to generate quantization results;
fourth means for encoding the quantization results generated by the third means into words of a prescribed variable-length code;
fifth means for controlling a code amount of the words generated by the fourth means by adjusting the quantization scale factor used in the third means;
sixth means for detecting characteristics of the input moving pictures;
seventh means for detecting whether or not a scene change occurs in the input moving pictures on the basis of the characteristics detected by the sixth means;
eighth means for detecting an average value of the quantization scale factor used in the third means for each of the input moving pictures;
ninth means for detecting a code amount generated by the encoding by the fourth means;
tenth means for calculating an actual complexity of each past encoded picture among the input moving pictures from the quantization-scale-factor average value detected by the eighth means and the code amount detected by the ninth means;
eleventh means for deciding whether or not a next encoded picture among the input moving pictures corresponds to a scene change, the occurrence of which is detected by the seventh means;
twelfth means for calculating an estimated complexity of the next encoded picture from the actual complexity of a past encoded picture same in type as the next encoded picture which is calculated by the tenth means in cases where the eleventh means decides that the next encoded picture does not correspond to a scene change;
thirteenth means for calculating an estimated complexity of the next encoded picture from the actual complexity of a past encoded picture different in type from the next encoded picture which is calculated by the tenth means in cases where the eleventh means decides that the next encoded picture corresponds to a scene change;
fourteenth means for deciding a value of the quantization scale factor used in the third means for the next encoded picture in response to the estimated complexity of the next encoded picture which is calculated by one of the twelfth means and the thirteenth means;
fifteenth means for calculating a frame activity of each of the input moving pictures;
sixteenth means for calculating activities of fields in each of the input moving pictures, and adding the calculated activities of fields to calculate a two-field activity;
seventeenth means for calculating a ratio between the frame activity calculated by the fifth means and the two-field activity calculated by the sixteenth means;
eighteenth means for deciding whether or not the next encoded picture and a reference picture for the next encoded picture are equal in motion state on the basis of the ratio calculated by the seventeenth means;
nineteenth means for calculating an estimated complexity of the next encoded picture in response to the actual complexity of a past encoded picture same in type as the next encoded picture which is calculated by the tenth means in cases where the eighteenth means decides that the next encoded picture and the reference picture for the next encoded picture are equal in motion state;
twentieth means for calculating an estimated complexity of the next encoded picture in response to the actual complexity of a past encoded picture different in type from the next encoded picture which is calculated by the tenth means in cases where the eighteenth means decides that the next encoded picture and the reference picture for the next encoded picture are not equal in motion; and
twenty-first means for deciding a value of the quantization scale factor used in the third means for the next encoded picture in response to the estimated complexity of the next encoded picture which is calculated by one of the nineteenth means and the twentieth means.

2. An apparatus as recited in claim 1, wherein the thirteenth means operates for calculating an estimated complexity of the next encoded picture from the actual complexity of a past encoded P picture which is calculated by the tenth means in cases where the next coded picture is a B picture.

3. An apparatus as recited in claim 1, wherein the thirteenth means operates for calculating an estimated complexity of the next encoded picture from the actual complexity of a past encoded I picture which is calculated by the tenth means in cases where the next coded picture is a P picture.

4. A method of encoding a moving-picture signal, comprising the steps of:
a) generating motion-compensated predictive errors of input moving pictures of plural different types;
b) applying the input moving pictures and the generated motion-compensated predictive errors to an orthogonal transform device and thereby subjecting the input moving pictures and the generated motion-compensated predictive errors to orthogonal transform to generate transform-resultant coefficients;
c) quantizing, by using a quantizer, the generated transform-resultant coefficients in response to a variable quantization scale factor to generate quantization results;
d) encoding the generated quantization results into words of a prescribed variable-length code by using an encoder;
e) controlling a code amount of the words by adjusting the quantization scale factor;
f) detecting characteristics of the input moving pictures;
g) detecting whether or not a scene change occurs in the input moving pictures on the basis of the detected characteristics;
h) detecting an average value of the quantization scale factor used for each of the input moving pictures;
I) detecting a code amount generated by the encoding of the quantization results;
j) calculating an actual complexity of each past encoded picture among the input moving pictures from the detected quantization-scale-factor average value and the detected code amount;
k) deciding whether or not a next encoded picture among the input moving pictures corresponds to a scene change, the occurrence of which is detected;
l) calculating an estimated complexity of the next encoded picture from the calculated actual complexity of a past encoded picture same in type as the next encoded picture in cases where it is decided that the next encoded picture does not correspond to a scene change;

m) calculating an estimated complexity of the next encoded picture from the calculated actual complexity of a past encoded picture different in type from the next encoded picture in cases where it is decided that the next encoded picture corresponds to a scene change;

n) deciding a value of the quantization scale factor used for the next encoded picture in response to the estimated complexity of the next encoded picture which is calculated by one of the step I) and the step m);

o) calculating a frame activity of each of the input moving pictures;

p) calculating activities of fields in each of the input moving pictures, and adding the calculated activities to calculate a two-field activity;

q) calculating a ratio between the calculated frame activity and the calculated two-field activity;

r) deciding whether or not the next encoded picture and a reference picture for the next encoded picture are equal in motion state on the basis of the calculated ratio;

s) calculating an estimated complexity of the next encoded picture in response to the calculated actual complexity of a past encoded picture same in type as the next encoded picture in cases where it is decided that the next encoded picture and the reference picture for the next encoded picture are equal in motion state;

t) calculating an estimated complexity of the next encoded picture in response to the calculated actual complexity of a past encoded picture different in type from the next encoded picture in cases where it is decided that the next encoded picture and the reference picture for the next encoded picture are not equal in motion; and u) deciding a value of the quantization scale factor used for the next encoded picture in response to the estimated complexity of the next encoded picture which is calculated by one of the step s) and the step t).

5. A method as recited in claim 4, wherein the step m) comprises calculating an estimated complexity of the next encoded picture from the actual complexity of a past encoded P picture which is calculated by the step j) in cases where the next coded picture is a B picture.

6. A method as recited in claim 4, wherein the step m) comprises calculating an estimated complexity of the next encoded picture from the actual complexity of a past encoded I picture which is calculated by the step j) in cases where the next coded picture is a P picture.

* * * * *